(No Model.)
P. SAGNE.
ADVERTISING VEHICLE.
No. 566,539.  Patented Aug. 25, 1896.
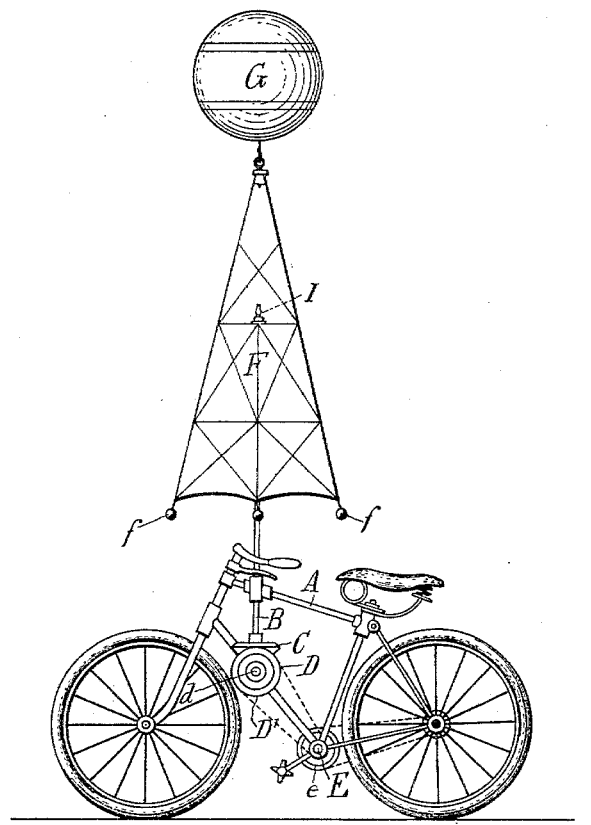

UNITED STATES PATENT OFFICE.

PAUL SAGNE, OF GENEVA, SWITZERLAND.

ADVERTISING-VEHICLE.

SPECIFICATION forming part of Letters Patent No. 566,539, dated August 25, 1896.

Application filed February 19, 1896. Serial No. 579,824. (No model.)

*To all whom it may concern:*

Be it known that I, PAUL SAGNE, merchant, of Geneva, Switzerland, have invented certain new and useful Improvements in Advertising-Vehicles, of which the following is a specification.

This invention relates to a revolving pavilion connected with a vehicle, preferably a tricycle. The pavilion is adapted to receive advertisements and to be rotated with a comparatively slow movement as the vehicle is propelled on the street.

The acompanying drawing illustrates the present improvement by a side elevation.

The vehicle represented may be either a bicycle or a tricycle, and it is provided with wheels and a frame A, and upon this frame a vertical arbor B is supported by a suitable bearing, and at the lower end is a beveled gear or friction wheel C, that is driven by a similar wheel D, and adjacent to the wheel D is a sprocket or chain wheel, around which the endless chain D' passes, and there is a small sprocket-wheel on the driving-shaft E, to which the ordinary pedals are attached, and at *e* a sprocket-wheel is represented for an endless chain leading to a sprocket-wheel on the axle of the rear wheel.

The vertical arbor B carries the pavilion F, which is made of a light framework, preferably of wire, and hollow, so as to receive around it a fabric, such as paper or muslin, with any advertising devices upon the surface thereof. This pavilion, being hollow, receives within it a lamp or light of any suitable character, as represented at I, by which the pavilion may be illuminated at night. In this case the covering on said pavilion should be translucent, in order that the advertisements may be clearly apparent.

At the lower corners of the pavilion F, I have represented bells at *f*, which by their sound may attract attention, and at the upper end of the pavilion a ball is represented at G, the surface of which is adapted to contain advertising-matter, and this ball may also be of translucent material and illuminated at night, or the ball may be a captive balloon.

The advertisements upon the surfaces of the pavilion may be displayed in any desired manner, and it will be apparent that as the vehicle is propelled a turning movement is given to the pavilion, whereby attention will be directed to the advertising-matter upon the surface thereof, and the proportion of the gearing should be such that the pavilion may not be rotated too rapidly.

I claim as my invention—

The combination with a vehicle such as a bicycle or tricycle having cranks for propelling the same by the feet of the rider and a pavilion or advertising-sign carrier, of bearings upon the frame of such vehicle, a vertically-placed arbor in said bearings adapted to carry the pavilion, a bevel-wheel upon the lower end of said arbor, an adjacent bevel-wheel and chain or band wheel upon an arbor in the lower bearing, an auxiliary chain or band wheel upon the crank-axle of the vehicle and a chain or band for rotating the pavilion from the crank-axle and simultaneous with the propelling movement of the machine, substantially as and for the purposes set forth.

In testimony whereof I have signed my name to this specification in the presence of two subscribing witnesses.

PAUL SAGNE.

Witnesses:
G. T. MERGELMINY,
TH. MIER.